(12) United States Patent
Hoelsaeter et al.

(10) Patent No.: US 6,816,335 B2
(45) Date of Patent: Nov. 9, 2004

(54) CARTRIDGE TRANSPORT AND LOADING APPARATUS AND METHOD

(75) Inventors: Haavard Hoelsaeter, Oslo (NO); Truls Simensen, Hagan (NO)

(73) Assignee: Tandberg Data ASA, Oslo (NO)

( * ) Notice: Subject to any disclaimer, the term of this patent is extended or adjusted under 35 U.S.C. 154(b) by 193 days.

(21) Appl. No.: 10/045,369

(22) Filed: Nov. 9, 2001

(65) Prior Publication Data

US 2004/0130819 A1 Jul. 8, 2004

(51) Int. Cl.[7] ............................................. G11B 15/68
(52) U.S. Cl. ........................................................ 360/92
(58) Field of Search ................................ 360/92, 98.04, 360/98.06; 369/30.06, 30.64, 30.69, 30.7, 30.57, 30.45, 30.43, 30.72, 30.85, 30.87; 242/337

(56) References Cited

U.S. PATENT DOCUMENTS 6,134,212 A * 10/2000 Pines et al. .............. 369/30.85
6,271,982 B1 * 8/2001 Helmick ...................... 360/92
2003/0086202 A1 * 5/2003 Hoelsaeter et al. ........... 360/92

* cited by examiner

*Primary Examiner*—Julie Anne Watko
(74) *Attorney, Agent, or Firm*—Schiff Hardin LLP

(57) ABSTRACT

A magnetic tape cartridge loader and unloader includes a platform positionable in front of a storage slot of a storage magazine and having a pivotable gripper that releases the cartridge from the storage slot, engages and pulls the cartridge from the slot onto the platform with a hook, engages a back edge of the cartridge with a second hook, and pushes the cartridge into a tape streaming device. The reverse operation is performed to unload the cartridge from the tape streaming device and store it in the storage magazine. The platform includes a locking device to hold the cartridge in position during movement of the platform. The gripper has two oppositely directed spring loaded hooks to engage the cartridge. The gripper is driven laterally by a threaded nut on a lead screw and is pivoted between engaging and disengaging positions of the cartridge engaging hook by a spur gear and gear segment arrangement on a guide along which the gripper slides. Sensors sense the position of the gripper to determine if a cartridge is engaged and to calibrate the automatic operation of the apparatus.

16 Claims, 14 Drawing Sheets

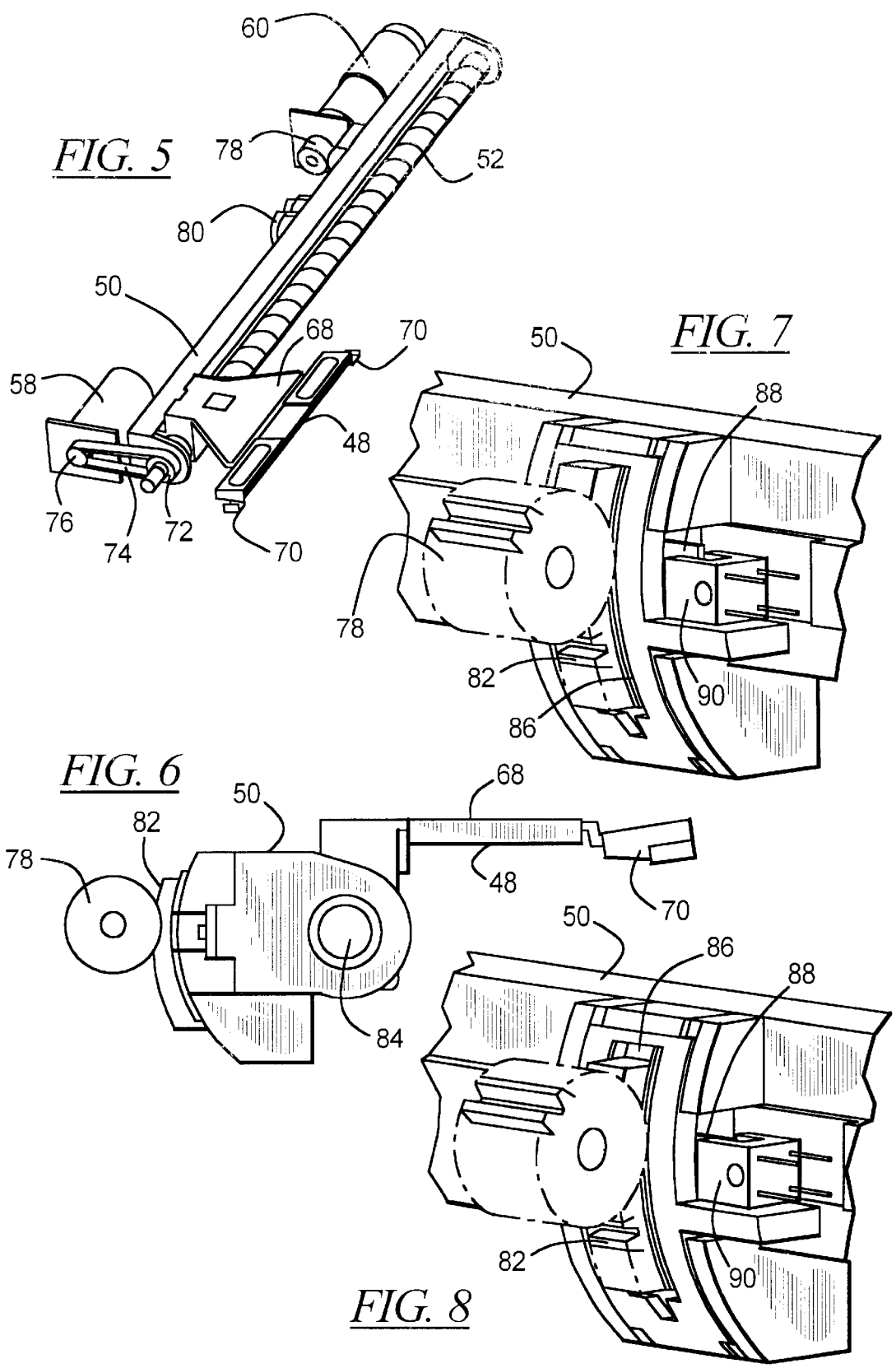

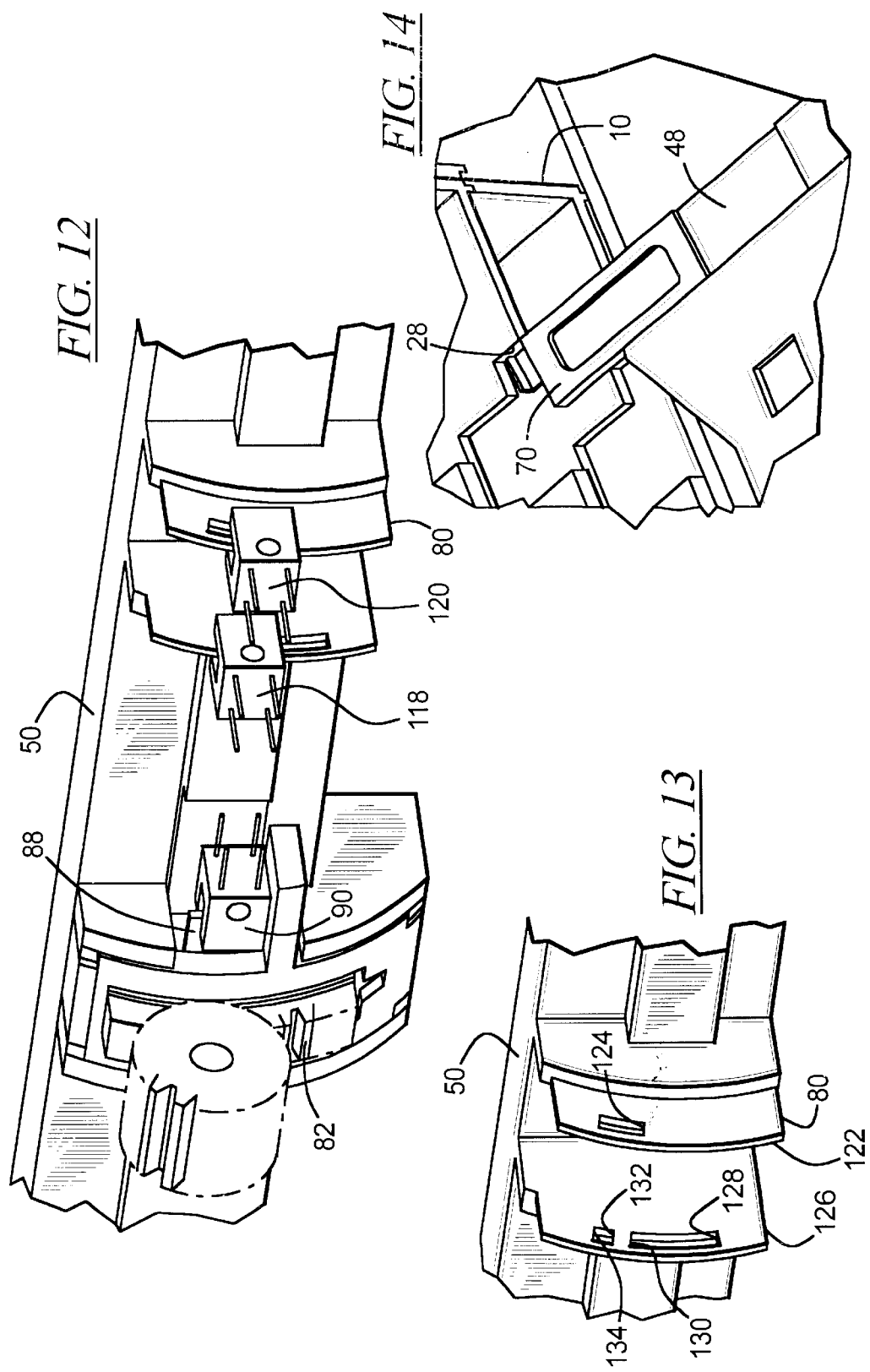

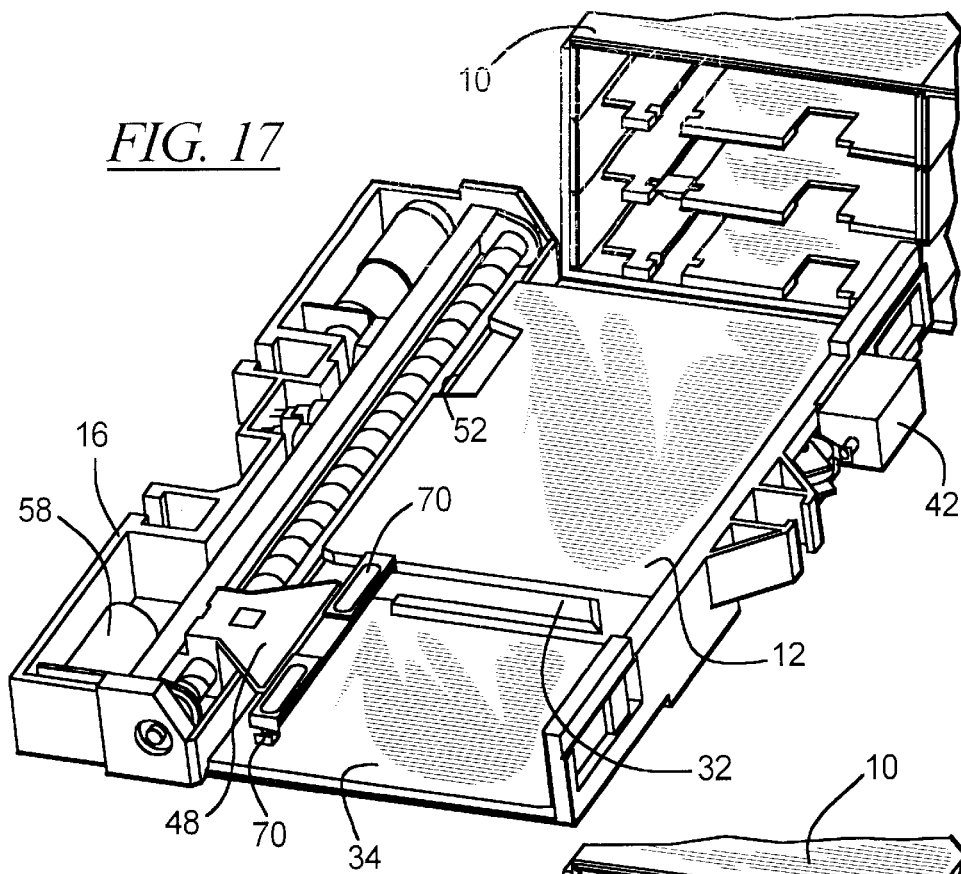
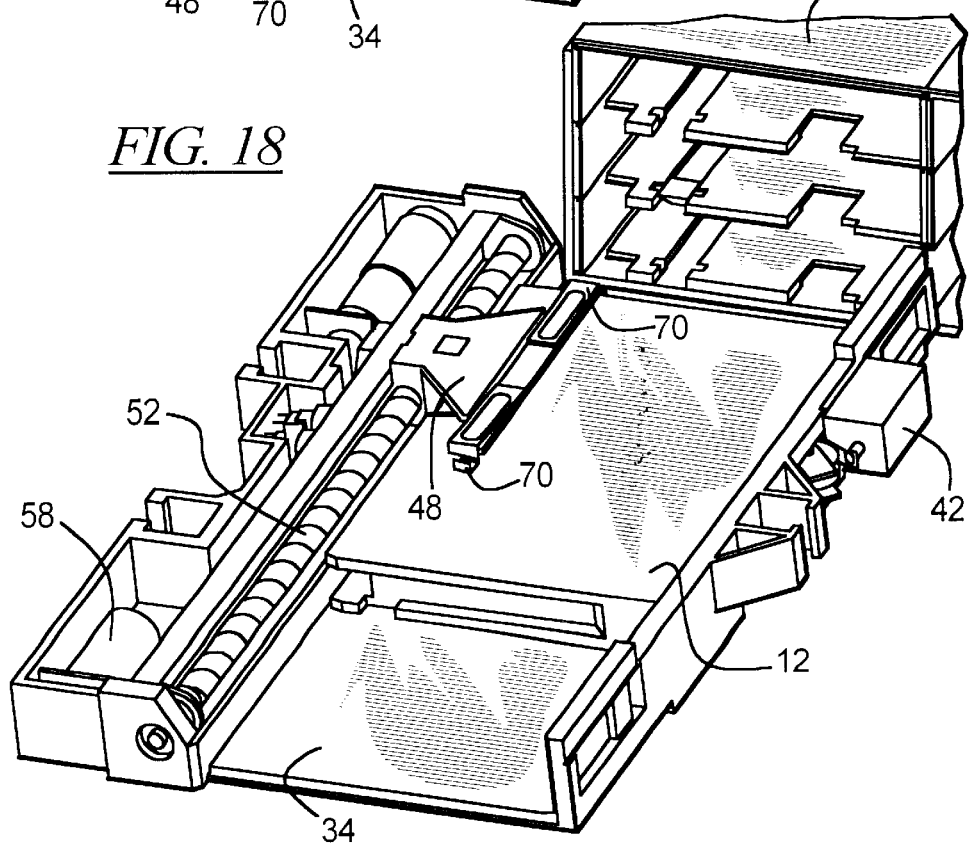

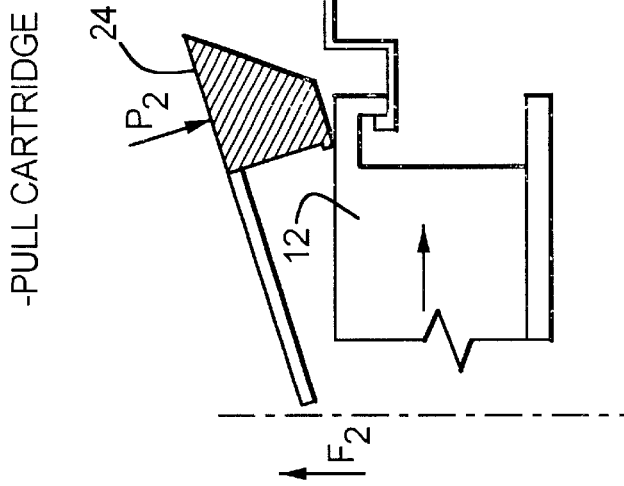
FIG. 22 -INSERT GRIPPER HOOK
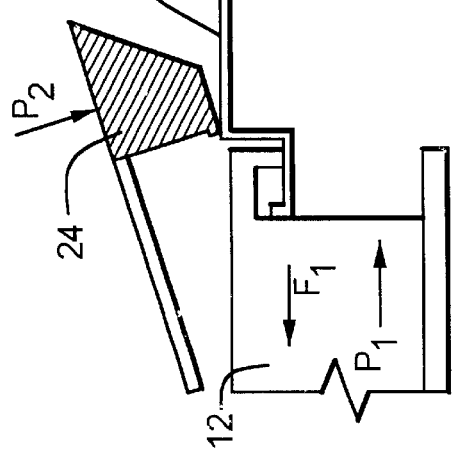
FIG. 23 -RELEASE SNAP -SECURE CARTRIDGE
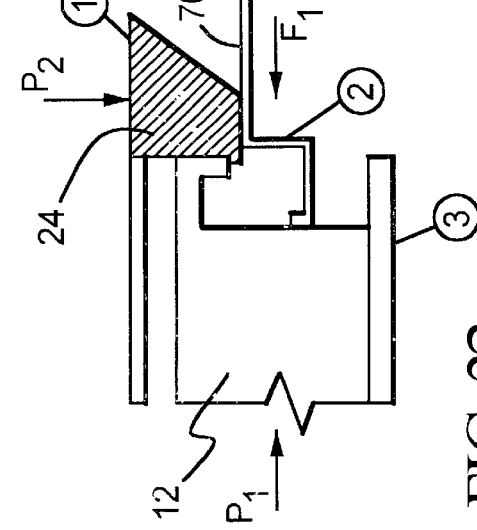
FIG. 24 -PULL CARTRIDGE
$P_1$ = SPRING FORCE, MAGAZINE
$P_2$ = SPRING FORCE, HOOK
$F_1$ = FORCE PUSH, GRIPPER HOOK
$F_2$ = FORCE LIFT, GRIPPER HOOK
$F_3$ = FORCE PULL, GRIPPER HOOK
① = CARTRIDGE LOCKING DEVICE
② = GRIPPER HOOK
③ = CARTRIDGE

CARTRIDGE TRANSPORT AND LOADING APPARATUS AND METHOD

BACKGROUND OF THE INVENTION

1. Field of the Invention

The present invention relates generally to a cartridge transport and loading apparatus and method and, in particular, to a device for transporting tape cartridges in a cartridges transport system for transport between a storage magazine and a tape streaming device and for loading the cartridge into the tape streaming device, unloading the cartridge from the tape streaming device, and loading the cartridge into the storage magazine and unloading the cartridge therefrom.

2. Description of the Related Art

Date storage and data backup on magnetic tape often requires the use of multiple tape cartridges. These multiple tape cartridges are selectively inserted into and removed from tape streaming device, also referred to as tape recording and playback devices. The utilization of multiple tape cartridges is required for expanded data storage and/or storage of the data from different data backup events. For example, a data backup plan may provide for the use of a different tape for each day of the seek.

Implementation of multiple tape cartridge storage has required a service technician to change the cartridges from the tape streaming device, store the cartridges, and log the event to ensure that the proper cartridge is used at the proper time. Failure on the part of the service technician to change the cartridge at the right time or to use the correct cartridge can result in a failure of the data storage or backup plan.

The increase in data file size and the increased numbers of data files to be stored on a data storage system along with the increased dependance on data is an electronic format has lead to a greater need for reliable high capacity data storage and backup.

SUMMARY OF THE INVENTION

The present invention provides automatic loading and unloading of cartridges, such as magnetic tape cartridges into and out of a tape streaming device.

The present invention also provides transport of cartridges between tape streaming devices and a storage magazine.

The invention also provides a compact device for transport of cartridges which occupies little space.

These and other advantages of the present invention are provided in a cartridge transport apparatus having a cartridge support platform movable into alignment with a tape streaming device and/or a storage magazine, a gripper having first grip portions for engagement with a leading edge of the cartridge to pull the cartridge from the tape streaming device or a storage magazine, second grip portions for engagement with a trailing edge of the cartridge to move the cartridge along the platform, and a third engagement portion for contact with a trailing edge of the cartridge to push the cartridge into position in the tape streaming device or a storage magazine. The gripper of the present invention preferably has a latch release portion that releases a latch on the storage magazine to permit the cartridge to be removed therefrom.

BRIEF DESCRIPTION OF THE DRAWINGS

FIG. 5 is a perspective view of the gripper and drive system of the cartridge transport and loading apparatus;

FIG. 6 is an end view of the gripper and the gripper rotation drive;

FIG. 7 is a perspective view of the gripper rotation drive and a hook switch;

FIG. 8 is a perspective view of the hook switch in a blocked rotation position;

FIG. 12 is a perspective view of the sensor arrangement for the gripper housing;

FIG. 13 is a perspective view of the sensor plates on the gripper housing;

FIG. 14 is a top perspective view of the calibration of the gripper and magazine;

FIG. 17 is a perspective view of the step of pulling the cartridge from the storage magazine;

FIG. 18 is a perspective view of the step of engaging the cartridge for pushing along the platform;

FIG. 22 is a side cross section of a tape cartridge engaged by the latch in the storage slot;

FIG. 23 is a side cross section of the latch of FIG. 22 being released;

FIG. 24 is a side cross section of the hook pulling the cartridge from the slot after release of the latch;

DETAILED DESCRIPTION OF THE PREFERRED EMBODIMENTS

Figure 1:
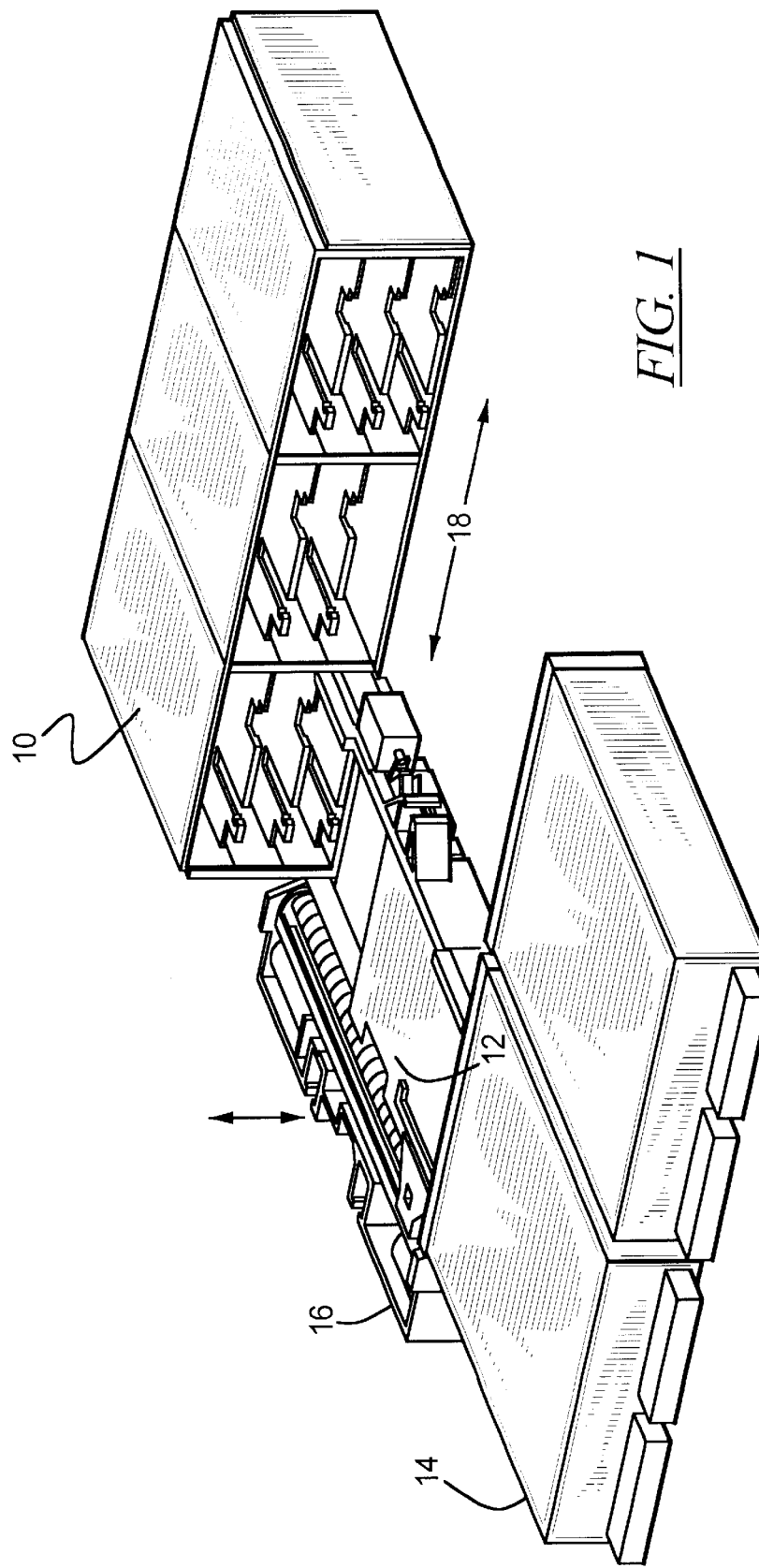
FIG. 1 is a perspective view of a cartridge storage magazine and tape streaming devices between which is a tape transport and loader device according to the present invention.

FIG. 1 shows a cartridge storage magazine 10 in which tape cartridges 12, such as magnetic tape cartridges, are stored. Multiple storage locations are provided for a plurality of cartridges 12. Tape streaming devices 14, also referred to as tape recording and playback drives, are also provided, these being disposed opposite the storage magazine 10.

Between the storage magazine 10 and the tape streaming devices 14 is the cartridge transport and loading device 16 of the present invention. The transport and loading apparatus 16 is shown in the position to move the cartridge 12 between a lower, left storage position in the storage magazine 10 and a left-most tape streaming device 14. Further devices are provided to move the transport apparatus 16 in a lateral direction as indicated by arrow 18 and for moving the transport apparatus vertically. Devices to move the apparatus laterally are well known and may include a threaded nut on a rotationally driven lead screw, for example. Further disclosure of such well known devices is unnecessary. The mechanism for moving the transport apparatus 16 vertically is disclosed in co-pending U.S. patent application Ser. No. 10/052,853 filed Nov. 7, 2001, which is incorporated herein by reference.

Figure 2:
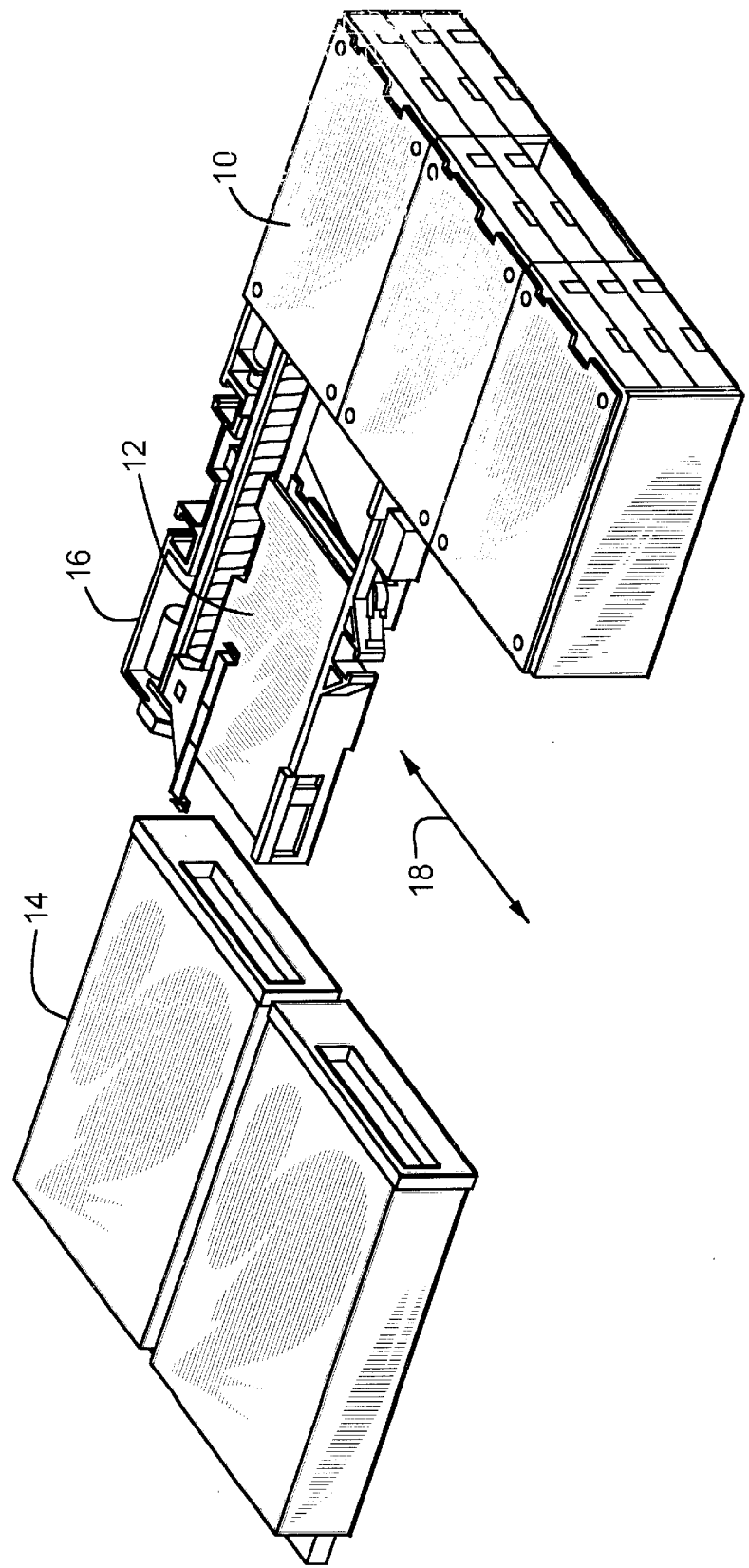
FIG. 2 is a perspective view of a cartridge storage magazine and tape streaming devices between which is a tape transport and loader device of FIG. 1 from the other direction.

FIG. 2 shows the transport and loading apparatus 16 of the present invention in relation to the loading slots of the tape streaming devices 14. Two such tape streaming devices 14 are provided in side-by-side relation, although other arrangements of tape streaming devices are envisioned. As mentioned above, the transport and loading apparatus 16 may be moved in the direction of the arrow 18 to load and unload the cartridge 12 from either of the two tape streaming devices 14.

Figure 3:
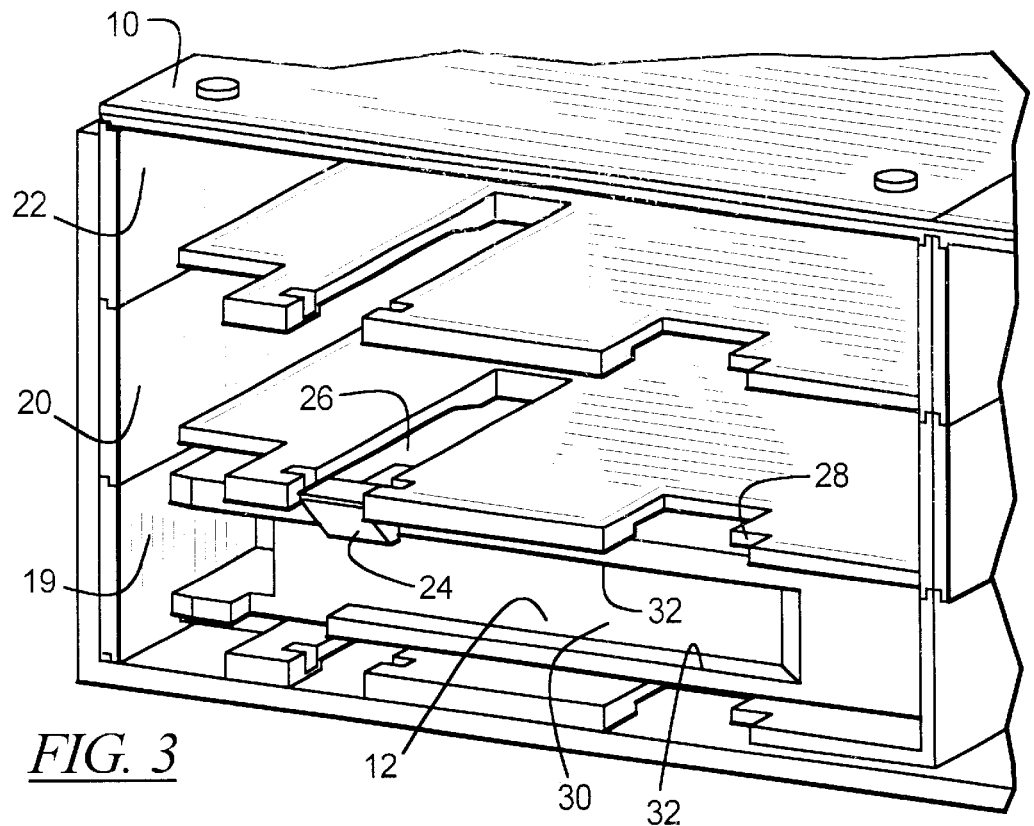
FIG. 3 is an enlarged perspective view of the storage magazine with a tape cartridge stored therein.

Referring to FIG. 3, the tape cartridge 12 is stored in a slot 19 in the storage magazine 10. Other storage slots 20 and 22 are provided above the slot 19 and can be accessed by moving the transport and loading apparatus 16 vertically, as disclosed in the co-pending application Ser. No. 10/052,85 filed Nov. 7, 2001. The storage slot 19 has a latch 24 biased toward a locking position by a locking spring 26. The latch 24 engages the cartridge 12 to prevent inadvertent dislodging of the cartridge 12 from the slot 19. The cartridge 12 can be removed from the slot 19 only by lifting of the latch 24. The storage magazine 10 also has a calibration notch 28, as will be described later.

Each slot of the storage magazine has a spring (not shown) at the back wall that pushes the cartridge 12 outward. This causes a secure engagement of the cartridge by the latch 24 and permits easy removal upon lifting of the latch 24. All of the storage slots are provided with the back wall springs and the latches 24.

As can be seen in FIG. 3, the cartridge has a recess 30 along the side. An undercut is provided at the edge 32, as will become apparent later from the description of FIG. 22.

Figure 4:
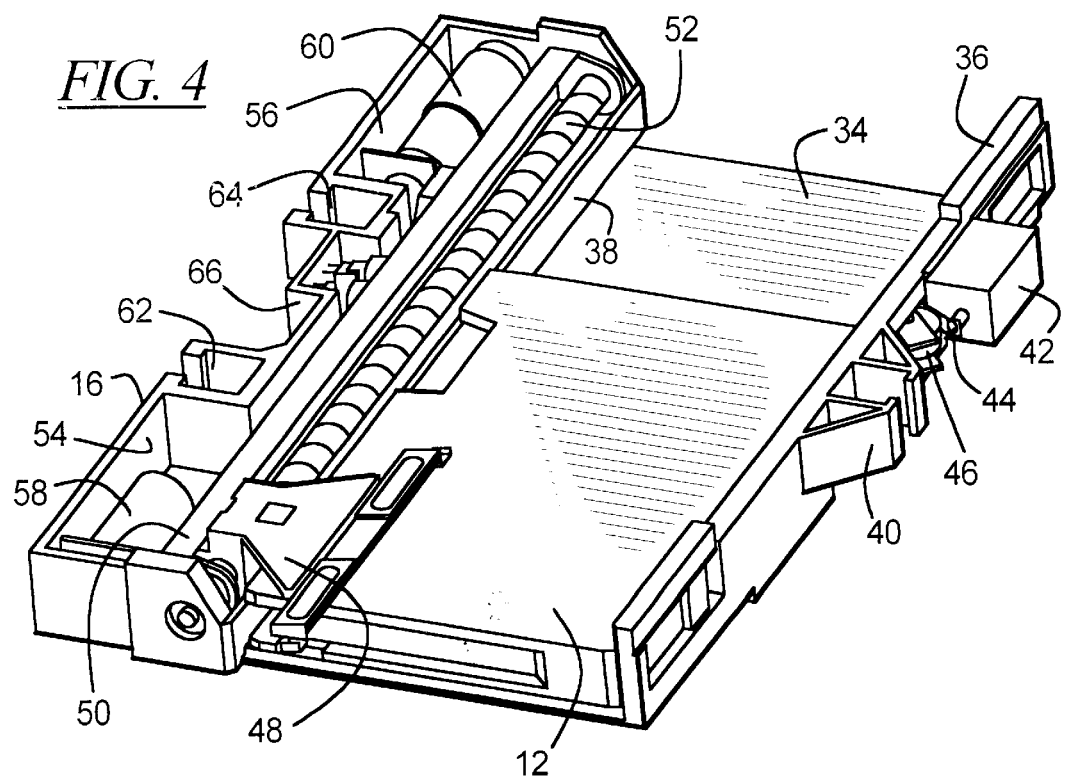
FIG. 4 is a perspective view of the cartridge transport and loading apparatus according to the principles of the present invention.

In FIG. 4, the cartridge 12 is on the transport and loading apparatus 16, and specifically is resting on a support platform 34 having side walls 36 and 38 to define a sliding channel along which the cartridge 12 is moved. The support platform 34 has a bracket 40 for holding a nut of a lifting apparatus, as described in the co-pending application, and a locking device 42 to selectively restrict movement of the cartridge 12. In particular, the locking device 42 is a solenoid which activates a roller stop 44 that selectively engages a roller 46. The roller 46 mounted on the side wall 36 contacts the cartridge 12 as the cartridge 12 is on the platform 16. The roller 46 rolls as the cartridge 12 moves along the sliding channel. By activating the solenoid 42, the roller stop 44 prevents movement of the roller 46 and as a result also stops movement of the cartridge 12. The cartridge 12 is thus prevented from being dislodged during movement of the platform 16.

On the opposite side of the platform 16 from the locking device 42 is a gripper 48 on a gripper guide 50. The gripper 48 is mounted for movement under control of a lead screw 52. Compartments 54 and 56 are provided in the platform 16 in which are mounted a lead screw motor 58 and a gripper rotation motor 60, respectively. Also provided in the platform 16 are passageways 62 and 64 for the vertical lifting apparatus and a compartment 66 for sensors.

In FIG. 5, the gripper 48 and gripper drive apparatus are shown separately. Specifically, the gripper has a gripper body 68 on which are mounted two gripper hooks 70. The base of the gripper body 68 has a threaded nut portion that encircles the threaded lead screw 52. Rotation of the lead screw 52 causes the gripper 48 to move axially along the length of the lead screw 52. The lead screw 52 is mounted for rotation in the gripper guide 50 and has a cog wheel 72 at the end thereof. A timing belt, or cog belt, 74 extends about the cog wheel 72 and also about a second cog wheel 76 that is driven by the lead screw motor 58. The lead screw motor 58 is a DC motor, such as a motor with a tach-generator feedback.

The gripper rotation motor 60 drives a spur gear 78 that in turn drives the rotation of the gripper guide 50 to rotate the gripper 48 between gripping and non-gripping positions. Sensor plates 80 are provided on the gripper guide 50 as well.

Turning to FIG. 6, an end view of the gripper guide 50 shows the spur gear 78 in engagement with a gear segment 82 on the gripper guide 50. The gripper guide 50 rotates about an axis 84 when the spur gear 78 is driven, so that the gripper 48 rotates between a lifted and a lowered position. The gripper hook 70 at the distal end of the gripper body 68 undergoes the greatest vertical movement when rotated.

FIG. 7 shows the rotated position of the gripper guide 50. The gear segment 82 extends from a guide channel 86 in which it is permitted to move when driven by the spur gear 78. A plate 88 extends laterally from the gear segment and into a sensing space of a sensor 90. The sensor 90 is a force sensor that senses the whether the gripper hook is free to move upward. The sensor 90 is used for feedback during the loader operation. For example, the weight of the cartridge is sensed during gripping of the cartridge by the gripper hook to determine if the cartridge is engaged or whether it has been lost and needs to be re-gripped. The sensor is also utilized during the calibration sequence to sense the rigid inner wall of the cartridge slot. rotated position of gripper guide 50.

The gripper guide 50 is in its non-rotated position in FIG. 8, wherein the gear segment 82 is moved to an opposite end of the guide channel 86 compared to FIG. 7. The plate 88 is in a blocking position of the photo-interrupter sensor 90. The present autoloader apparatus is thereby able to sense the position of the gripper guide 50 as it is rotated.

Figure 9:
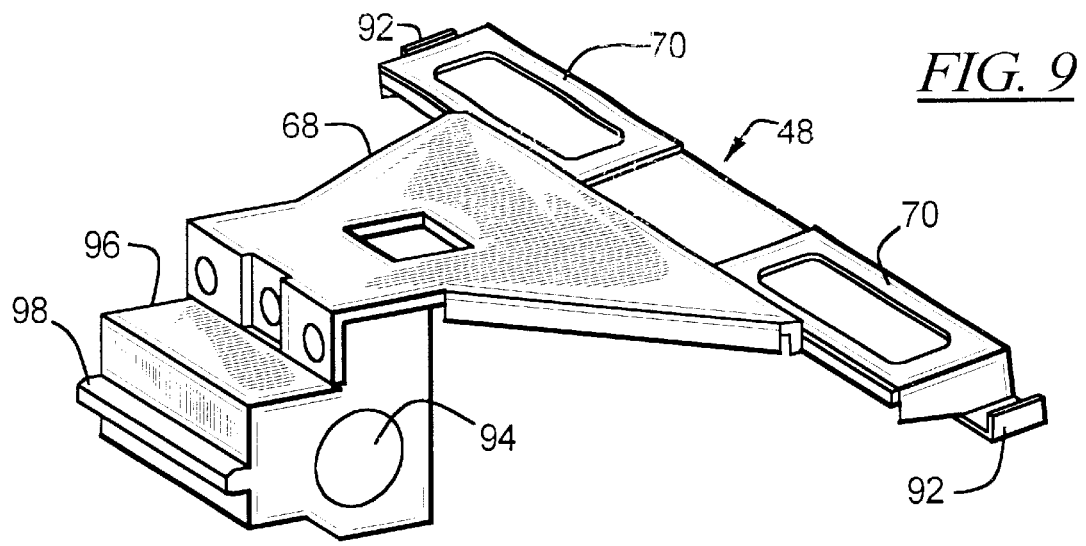
FIG. 9 is a perspective view of the gripper and gripper nut.

FIG. 9 shows the gripper 48 including the gripper body 68 with the gripper hooks 70 at opposite ends of the distal end. The gripper hooks 70 are formed of spring metal or other flexible material and shaped with a cartridge hook 92 at the end most part. The gripper body 68 connects the gripper hooks 70 to a gripper nut 94 which is mounted on the lead screw 52. The gripper nut 94 has a guide portion 96 extending in a generally opposite direction of the gripper body 68 and a guide flange 98 is provided on the guide portion 96.

Figure 10:
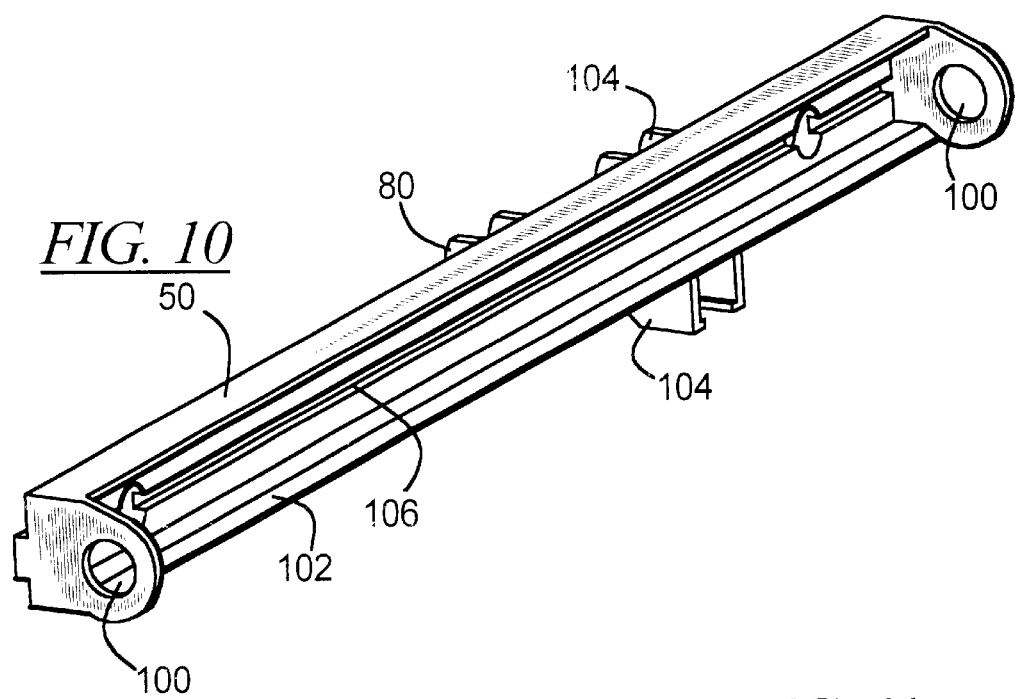
FIG. 10 is a perspective view of the gripper housing of the present apparatus.

In FIG. 10, the gripper body 68 has a lair of bores 100 through which the lead screw 52 extends and a channel 102 extending parallel to the axis of the lead screw 52 along which the guide portion 96 slides as it is moved along the lead screw 52. The guide portion 96 moves due to the threaded gripper nut (FIG. 9) being threadably engaged on the lead screw 52. A gear housing 104 in which the gear segment 82 is mounted is provided on the gripper guide 50, the gripper guide thereby being rotated by driving the spur gear 78 under control of the motor 60. To ensure that the gripper 48 and the gripper housing 50 rotate as one, the gripper housing has a guide slot 106 into which the guide flange 98 fits. The guide flange 98 slides along guide slot 106 as the gripper 48 is moved in the gripper housing 50.

Figure 11:
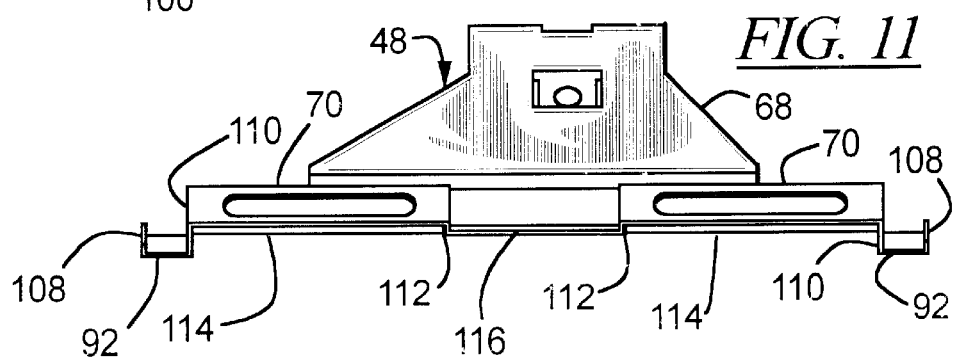
FIG. 11 is a perspective view of the gripper.

FIG. 11 illustrates the shape of the cartridge hooks 92 on the hook portions 70. The distal end of each cartridge hook 92 is turned up at 108. The hooks 92 have a down turned portion 110 that provides both a pulling surface for the cartridges. The hook portions 70 are flexible and are anchored at 112. The support for the hook portions 70 is provided by arms 114 of the gripper body 48 on which the hook portions 70 rest and a central portion 116 under which the central part of the hook portions 70 is secured.

The sensors for the gripper guide 50 are shown in FIG. 12, wherein the sensor plates 80 are shown with sensors 118 and 120 positioned thereon. The sensors 118 and 120 are photo-interrupters that detect transmission or blockage of light between the two parts thereof. The sensor 90 is shown as well, with the plate 88 of the gear segment 82 therein.

FIG. 13 illustrates the defined rotation positions that are sensed by the sensor plates 80 using the sensors 118 and 120. The first of the sensor plates 80, in particular, the sensor plate 122 has an opening with a lower edge 124 defining a gripper endstop. The second of the sensor plates 80, in particular, the sensor plate 126 has two openings with edges defining four gripper positions 128, 130, 132 and 134. The significance of these positions will become apparent in the following.

Operation of the Cartridge Transport Apparatus

The challenge that led to the present invention was to pick up a data storage cartridge 12 from a slot in a magazine 10 and deliver it to a tape streamer 14 on the other side of the device. It had to be possible to pick up a cartridge 12 at one side and deliver it on the other side, and then pick it up again and deliver it on the initial side. In other words, the cartridge 12 had to pass through the device in both directions. The whole device should fit inside a 19-inch rack. The height in the system is critical, and it was a demand that the mechanism used as little height as possible.

Standard cartridges 12 should be used, and no new design or changes to the existing cartridges should be performed. The cartridges 12 are rectangular and have only one undercut edge on each side. This limits the possibilities for gripping and handling the cartridges.

The environment in which the present invention is used includes the following:

The cartridges 12 are stored horizontally in a magazine 10. They are held in place by the latch 24, preventing them from falling out. Additionally there is a spring in the inner end of each cartridge slot 19, 20 or 22, which is compressed when a cartridge 12 is in the slot and presses the cartridge 12 towards the latch 24.

As shown in FIG. 22, to release a cartridge 12 from a magazine slot 19, for example, the latch 24 at the slot opening must be lifted. Then the compressed spring in the back of the slot 19 which exerts the force P1 will push the cartridge 12 outwards, out of the slot 19 as shown in FIG. 23. The latch 24 must be lifted long enough for the cartridge front edge to come out in order to get the cartridge 12 out of the slot 19 as shown in FIG. 24.

On the other side of the device one or two tape streamers 14 or additional magazines are placed. Each streamer 14 has a horizontal slot for a cartridge. To load a cartridge 12 in a drive 14, the cartridge 12 must be pushed into the slot far enough for the feed mechanism in the drive 14 to start.

When a cartridge 12 is to be picked up from the drive 14, the feed mechanism in the drive pushes the cartridge 12 partially out of the slot, and releases it. It is then free to be picked up.

Figure 20:
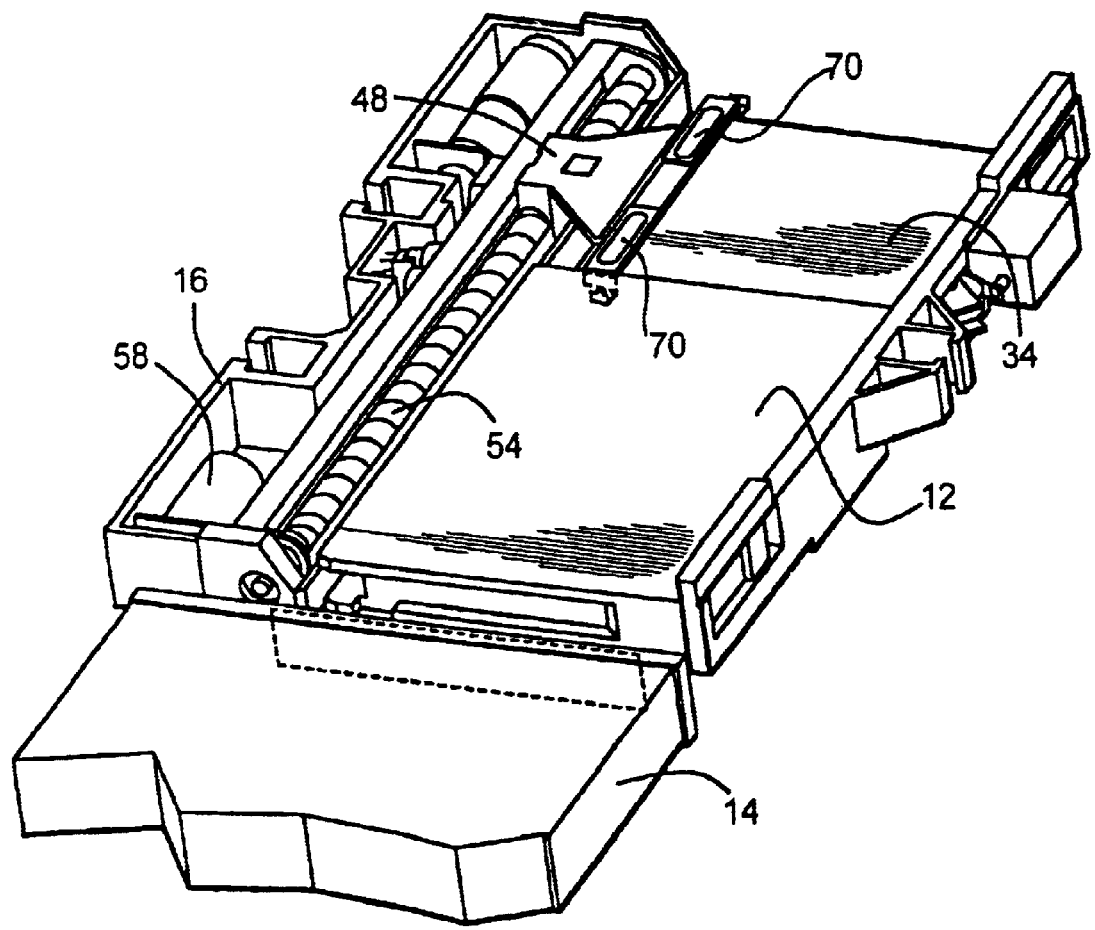
FIG. 20 is a perspective view of the step of pushing the cartridge into the tape streaming device.
Figure 21:
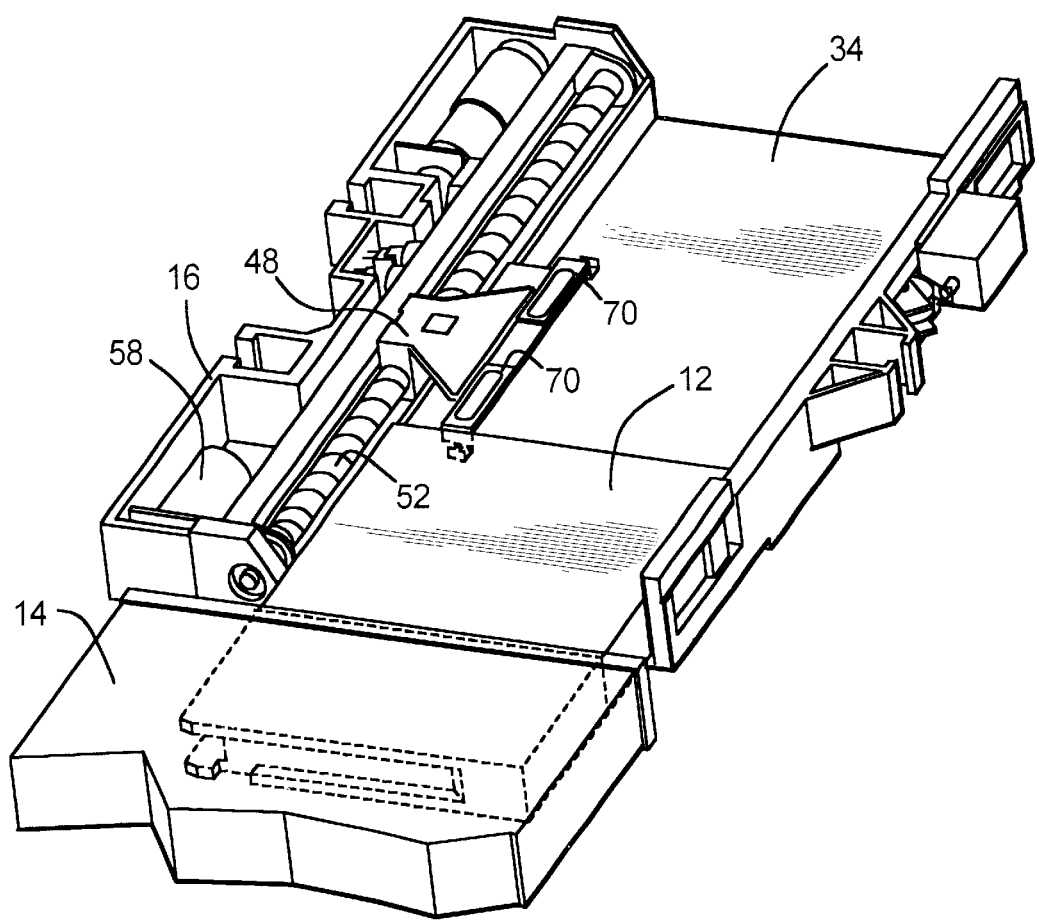
FIG. 21 is a perspective view after the cartridge has been pushed into position in the tape streaming device.

The multi-position gripper device 48 of the present invention uses very little space. It is based on a gripper device 48 mounted on a nut 94 that runs along a lead screw 52. The gripper device 48 has a hook 70 in each end, which is used to pull the cartridge 12, as shown in FIG. 17, out from the magazine slot 19 or the slot on a drive 14, by hooking under the undercut edge of the cartridge 12 as shown in FIGS. 22–24. The hook 70 can be lifted/lowered to given positions to enable gripping or releasing the cartridge 12. The same hooks 70 are also used to push the cartridges 12 into the slots 19 in the magazine 10 and the drives 14, as shown in FIGS. 20 and 21. When a cartridge 12 is to be picked up from a slot 19 in the magazine 10, the gripper hook 70 first pushes the cartridge 12 a small amount further into the slot 19 as denoted by F1 in FIG. 22. This is to ensure that the latch 24 is easy to lift. Then the hook 70 is lifted as denoted by F2 to grip the cartridge 12 as shown in FIG. 23. The gripper hooks 70 are formed in such a way that the latch 24 (that prevents the cartridge 12 from falling out) is lifted simultaneously as the hook 70 grips the undercut edge on the cartridge 12. In this way the cartridge 12 is released from the magazine slot 19 at the same time it is hooked onto the gripper hook 70. When moving the gripper hook 70 out of the slot 19 as shown by F3 in FIG. 24, the cartridge 12 is pushed against the hook 70 due to the spring in the back, and thus preventing the latch 24 from falling down in front of the cartridge 12 and locking it in the slot 12. In this way the gripper hook 70 serves several functions in one operation.

The gripper device 48 is moved linearly by rotating the lead screw 52. Rotation of the lead screw 52 is achieved by using a DC motor 58. To prevent the nut 94 from rotating when the lead screw 52 runs, it has the flange 98 running in the slot 106 along the total length of movement. The slot 106 is in a housing 50, which also works as the tilting device (height positioning) for the gripper hook 48. The housing 50 can rotate about the center axis of the lead screw 52, and a DC motor 60 is used to rotate the housing 50. When the housing 50 rotates, the gripper device 48, and also the hooks 70, is rotated along an arc.

Figure 19:
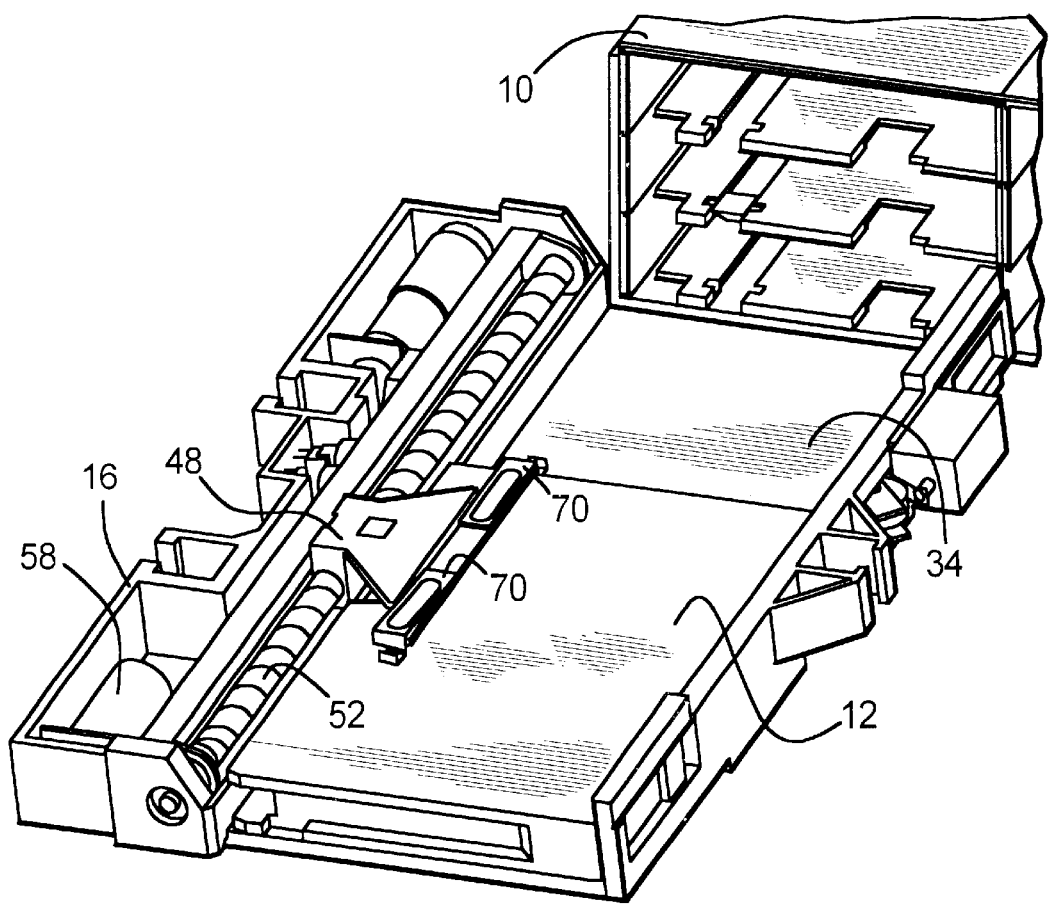
FIG. 19 is a perspective view after the cartridge has been pushed across the platform toward the tape streaming device.

The lead screw assembly is mounted along a platform 16, over which the cartridge 12 is moved. The gripper hook 70 drags the cartridge 12 out of the magazine slot 19 and as far across the platform 16 as possible, as shown in FIG. 17. It then releases the cartridge 12, tilts up and moves across to the other side of the cartridge 12. The hook 48 is then tilted down on top of the cartridge 12, as shown in FIG. 18. One of the edges 110 on the hook 70 will touch the backside of the cartridge 12, the other hook 70 is flexed upwards, and when the gripper device 48 is moved, the cartridge 12 is pushed across the platform 16. When the cartridge 12 is moved to the end of the platform 16 as shown in FIG. 19, the gripper 48 tilts up and moves away from the cartridge 12. There it tilts down and pushes the cartridge 12 completely off the platform 16 and into the drive 14 as shown in FIGS. 20 and 21.

When the cartridge 12 is to be removed from the drive 14 and placed in the magazine 10, the gripper hook 48 works in the same way, but in the opposite direction. It drags the cartridge 12 out of the drive slot, moves back and pushes it as far across the platform 16 as possible. It then releases the cartridge 12 and moves to the other end. There it tilts down and pushes the cartridge 12 into a magazine slot 19.

Positioning and tilting of the gripper hook 48 is based on feedback pulses from tacho-generators on the DC motors 58 and 60. But this method is inaccurate due to backlash in the system. It is not much of a problem for moving the gripper 48 along the lead screw 52, but the tilting of the gripper hook 70 is critical and needs better positioning. To get an exact rotation of the gripper hook 70, the system uses the sensors and photo-interrupters 90, 118 and 120 at given positions, which gives a discrete positioning which is independent from the backlash in the system. The photo-interrupters 118 and 120 operate in combination with sensor plates 80. The plates 80 have holes at certain points, which allows light to pass through. By monitoring the signals from the photo-interrupters one will know when the gripper hook 48 is tilted to an exact position.

There are several slots in the magazine 10, and the device has to be positioned relative to them. This is taken care of by other mechanisms. The present application is directed to the device that picks up a cartridge 12, stores it on the platform 16 and delivers it when told. While the device is moved to be positioned in front of a slot 19, the cartridge is held in place on the platform by a locking mechanism 42. This is necessary to prevent the cartridge from falling off the tray during transportation if a shock in the longitudinal direction should occur. Also while the gripper hook 48 moves from one side of the cartridge 12 to the other the cartridge 12 is locked from moving.

The gripper hook feedback system utilizes a control system to know whether the gripper hook 48 holds a cartridge 12 or not. This is necessary to have control of the gripper 48 when errors occur or when power is cut uncontrolled, and to check that the gripper 48 actually grips a cartridge 12 when it is supposed to. In other words, it is necessary to have a feedback signal from the gripper 48 when it holds a cartridge 12. This is solved using a sensor system 90 on the gripper housing 50, also called a hook switch.

The sensor system detects whether the gripper hook 48 is prevented from rotating freely or not. The rotation can be blocked by the following reasons:

1) The hook 48 is gripping a cartridge 12 and is thereby prevented from further rotation because the mass of the cartridge 12 is higher than the spring force in the hook switch
2) The hook 48 is touching underneath a flange on the calibration slot 28 in the magazine 10 (self-calibration mode. See description of calibration routine below).

The sensor system uses a spur gear 78 with a preloaded spring in a slider path 86, and a photo-interrupter 90 for sensing. The spring preload keeps the gripper device 48 in one position as long as it is unloaded. In this position the photo-interrupter 90 is open and light passes through from the LED to the receiver. If the gripper hook 48 is prevented from rotation, the spur gear 78 is moving relative to the gripper housing 50. This movement causes a plate 88 to move into the photo-interrupter 90 and prevents light from passing through. Hence the signal from the sensor 90 changes, and the control system "knows" that something is hooked on the gripper 48.

As shown in FIG. 14, the present invention is capable of self calibration of three axes by using one sensor. Calibration of the sensor system is based on positioning the gripper hook 48 relative to the slot 28 in the magazine 10. This relative positioning is used to calibrate three axis of movement in the complete autoloading system. All axes are calibrated using the signal from the hook switch sensor 90 as the calibration signal.

An initial calibration of the height of the gripper hook 70 is performed. The gripper hook 70 height relative the base in the cartridge sliding surface 34 is calibrated in the production of the system. In production, the position of the sensors 118 and 120 on the platform 16 is carefully adjusted relative the sensor plates 80 with the discrete positions to give exact positioning of the gripper hook 70 relative to the platform 16. One of the positions determined by the sensor plates 80 is the gripper calibration position.

Calibration of the elevator is performed by the elevator being moved to a position a small distance below the presumed calibration position. The gripper hook 70 is moved underneath the inner top wall of the magazine and rotated to the gripper hook calibration position. Because the elevator is a bit lower than the estimated calibration position, the gripper hook 70 can rotate freely to this position, and no signal is sensed from the hook switch sensor 90. Then the elevator is moved upwards while monitoring the signal from the hook switch 90 until the gripper hook 70 touches the top of the top inner magazine wall. The signal from the hook switch sensor 90 will then change, and when it does the position of the elevator relative to the magazine slot is known. It is thereby possible to align the height of the platform, and in particular the cartridge slider surface in the control system and the cartridge sliding surface in the magazine slot.

Calibration of the traverse is performed when the elevator is moved to the nominal calibration position, while the traverse is moved a small distance off the expected calibration position. The gripper hook 48 is rotated to the lowest position (Position B5) and moved into the calibration slot in the magazine. Then the gripper hook 48 is tilted upwards to the calibration position, so the signal from the hook switch sensor 90 changes. The traverse is then moved slowly while the signal from the hook switch sensor 90 is monitored. When the hook is completely free from the top inner magazine wall, the signal from the hook switch sensor 90 changes, and the exact position of the gripper hook 48 relative to the magazine slot in the traverse direction is known.

Calibration of the lead screw 52 is performed by the elevator and the traverse (shown in FIGS. 25 and 26) being moved to their nominal calibration positions. The gripper hook 48 is tilted to the lowest position (Position 135) and moved into the calibration slot in the magazine. The gripper hook 48 is rotated upwards to the calibration position. When the gripper hook 48 is in this position, the hook switch sensor 90 will give a signal that the gripper hook 48 is blocked by the top inner magazine wall. Next step is to move the gripper hook 48 slowly out of the slot while monitoring the signal from the hook switch sensor 90. When the hook switch sensor signal changes and tells that the gripper hook 48 is free, the position of the gripper hook 48 relative to the magazine and the cartridges is known.

The sequence of operation is as follows:

The operation of the device is based on three sequences, called Fetch, Flip Side and Shove. These three sequences are executed every time a cartridge is to be picked up and delivered. The sequences are basically the same regardless of whether the cartridge 12 is picked up from a magazine slot 19 and delivered to the drive 14, picked up from a drive 14 and delivered to a magazine slot 19, or moved from a magazine slot to a magazine slot. The three sequences carried out by the lead screw motor 58 and the tilting motor 60 are independent from which slot the cartridge 12 is to be delivered to or picked up at. This makes the programming of the shuttle and gripper operations very easy.

Below are described the operation and sequences the device executes when picking up a cartridge 12 in a magazine 10 and delivering it to a drive 14. This is one of the standard operations the device will perform, and illustrates the working principle of the device. It is assumed that the moving of the other mechanisms is finished before any of these sequences are executed.

The fetch operation: Fetch from front of the magazine

Figure 15:
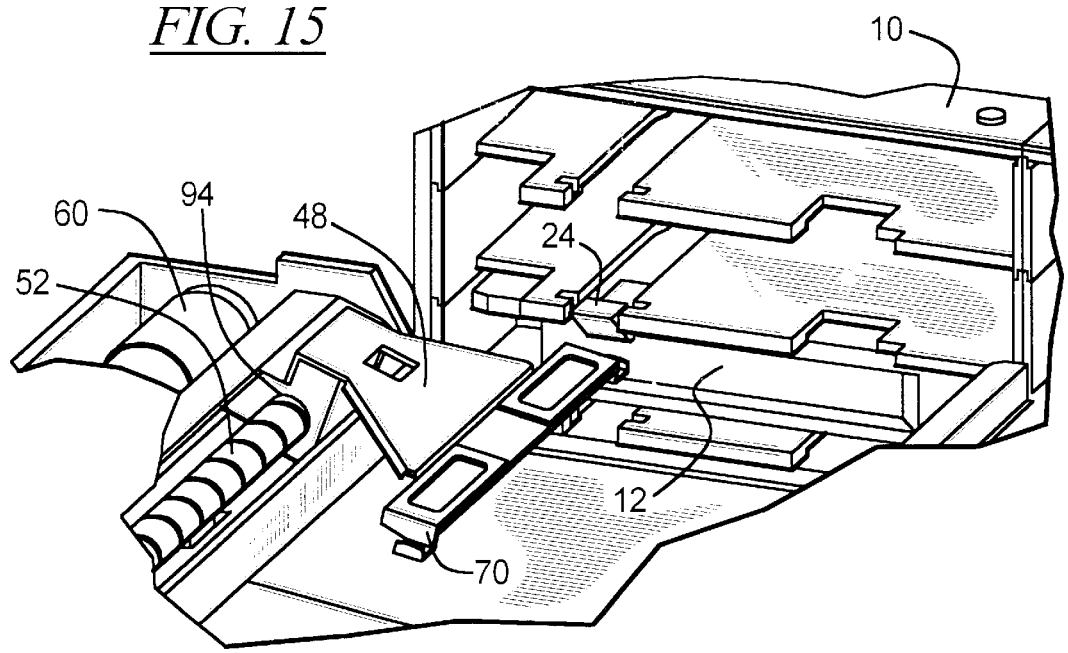
FIG. 15 is a perspective view of the step of pushing the cartridge into the storage magazine.
Figure 16:
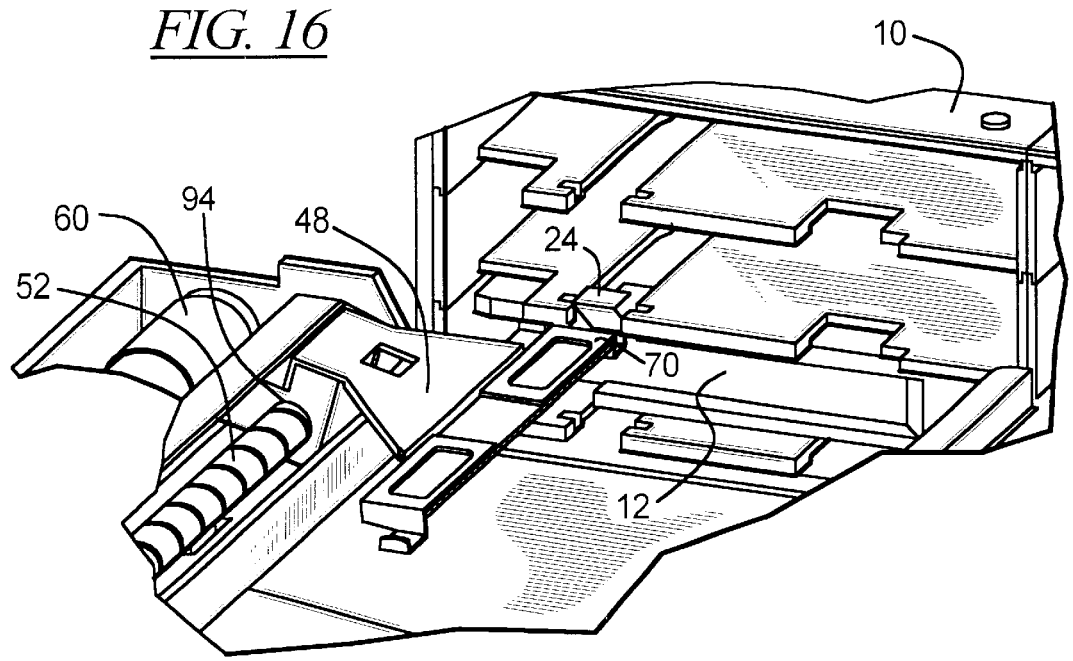
FIG. 16 is a perspective view of the step of releasing the cartridge from the storage magazine.

The gripper hook is tilted to the position B5 shown in FIG. 15 to push the cartridge center. A close up view is shown in FIG. 22. The gripper nut 94 is moved to a position Y5 to start pushing the cartridge 12, and the moved further onto a position Y1 for maximum push in toward the magazine side. As shown in FIG. 16, the gripper hook 70 is tilted up to a position B4 to grip the cartridge 12. This is shown in the enlarged view of FIG. 23 as well. Then the gripper nut 94 is moved back to a position Y5 to start pushing the cartridge 12 and further onto a position Y9 to hook the released cartridge 12 and move it towards the drive 14 as shown in FIG. 17.

The flip side operation: Back to front

The gripper hook 48 is tilted down to the position B5. Then the gripper nut 94 is moved to a position Y10. The gripper hook 48 is tilted up to a position B1 to pass over the cartridge 12 and the gripper nut 94 is moved to the position Y5. The gripper hook 48 is tilted to a position B3 to push on the cartridge top as shown in FIG. 18 and the gripper nut 94 is moved to a position Y7 to push the cartridge 12 towards the drive 14 as shown in FIG. 19. The gripper hook 48 is tilted to position B1, the pass over position, and the gripper nut 94 is moved to the position Y5. The hook 48 is tilted down to the position B5 and the gripper nut 94 is moved to a position Y6 as shown in FIG. 20.

The Shove operation: Shove to drive

The gripper nut 94 is moved to the position Y10 and the gripper hook 48 is tilted to the position B5 of FIG. 20. Then, the gripper nut 94 is moved to a position Y16, which is the load cartridge in drive position. The gripper nut 94 is then moved to the position Y5 as shown in FIG. 21. The cartridge 12 is thereby shoved into the drive 14.

The reverse operation to removed the cartridge 12 from the drive 14, move it to the storage magazine 10 and shove it in to a slot will be readily apparent to the person of skill in the art after review of the foregoing.

Figure 25:
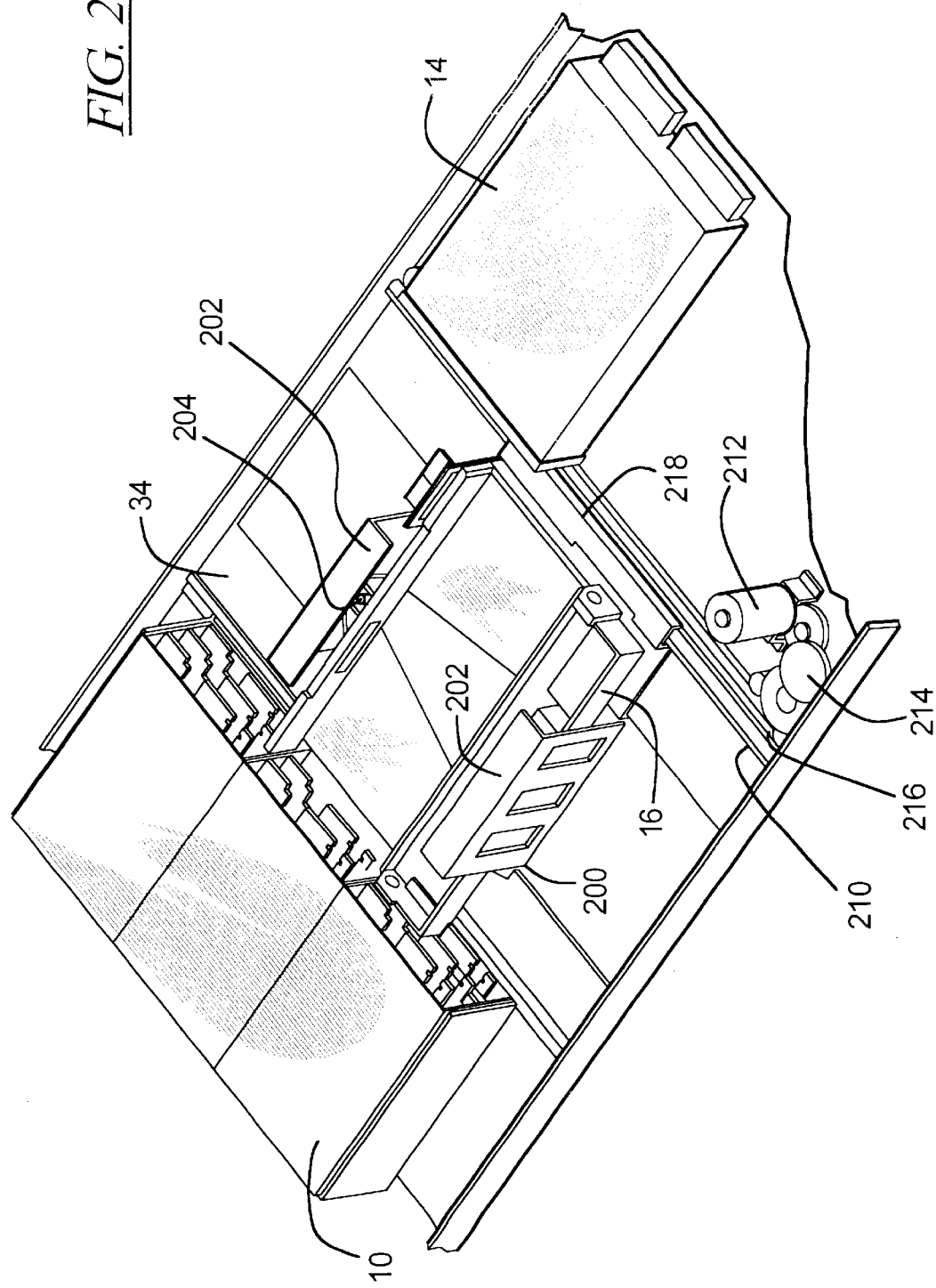
FIG. 25 is a perspective view of the present loading and transport apparatus with cooperating lateral and vertical transport apparatus.
Figure 26:
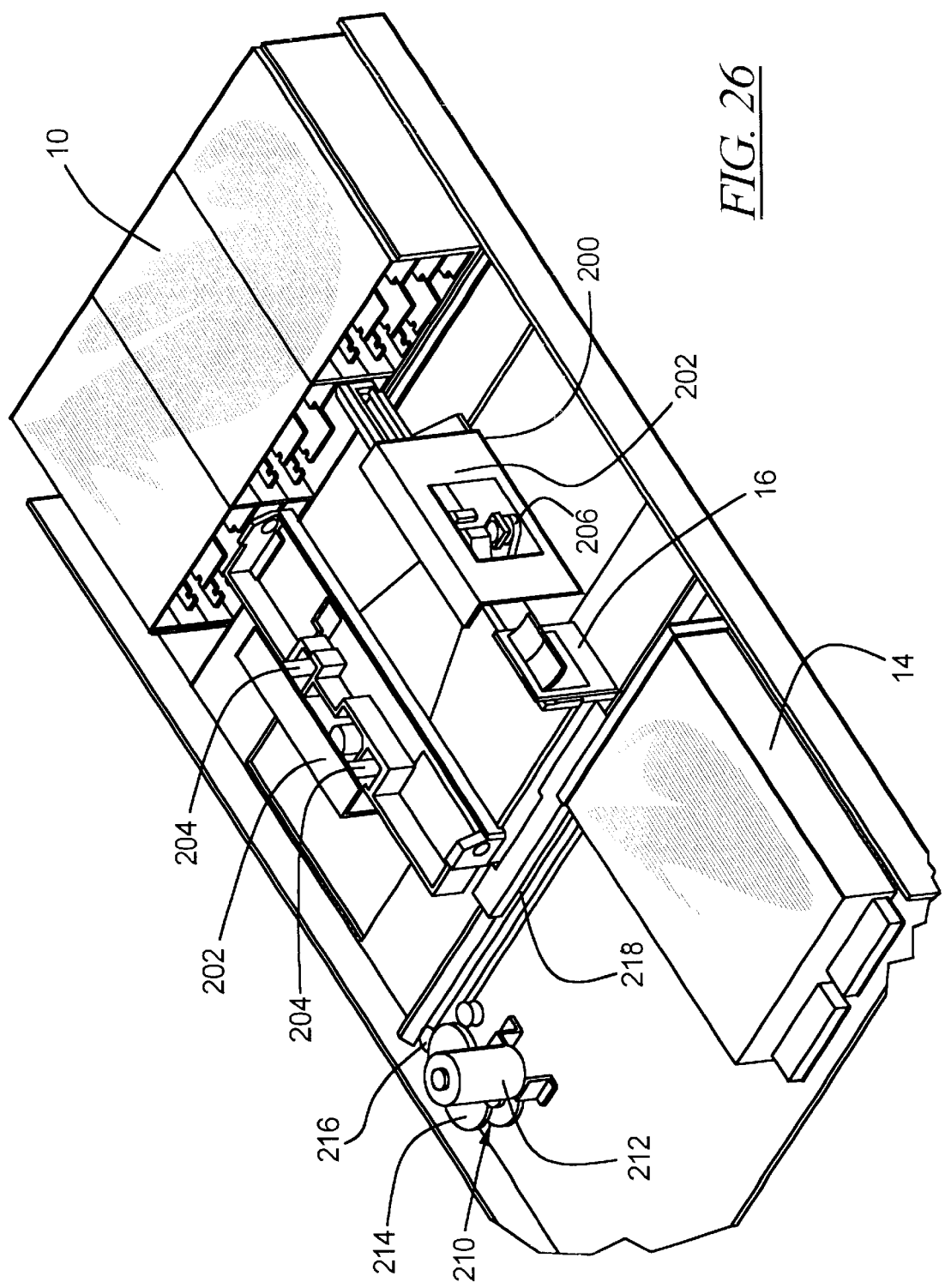
FIG. 26 is a second perspective view of the apparatus of FIG. 25.

The overall device in which the present transfer apparatus is provided is shown in FIGS. 25 and 26. In particular, the transfer apparatus is lifted by a lifting apparatus 200 including brackets 202 which support vertically disposed threaded lead screws 204 that are threadably engaged with threaded nuts 206 in the platform, as disclosed in further detail in co-pending patent application attorney docket number P01, 0373. This permits the transfer apparatus to access the upper slots of the storage magazine 10, in the illustrated example, or to access stacked tape streaming devices.

The transfer apparatus 16 is moved laterally by a drive apparatus 210 including a motor 212, a gear train 214, and a timing belt 216 and pulleys. The timing belt 216 is connected to the base 218 of the lifting device 200 so that when driven through the gear train 214 and motor 212, the lifting device 200 and the platform 16 mounted thereon are moved laterally. The transfer apparatus is thereby able to access side-by-side slots of the storage magazine 10 or side-by-side tape streaming devices 14.

As described above the gripper hook 48 needs to be positioned at a number of positions to ensure accurate and complete operation. Still this is no problem because the motion along each axis is easily controlled.

The present apparatus uses a minimum of height. In addition to the height of the cartridge 12 and the thickness of the platform 16, it only requires enough height to let the gripper hook 48 pass over the cartridge 12.

Of course, an appropriate electronic control circuit, preferably including a microprocessor, is utilized to control the operation of the various motors and to sense the output of the sensors so as to effect operation of the autoloader.

The present device has a low structural height and is compact in size. In a preferred embodiment, it will fit into a standard 19 inch rack. The present device also utilizes standard tape cartridges 12.

Although other modifications and changes may be suggested by those skilled in the art, it is the intention of the inventors to embody within the patent warranted hereon all changes and modifications as reasonably and properly come within the scope of their contribution to the art.

We claim:

1. A cartridge transport apparatus for transport of a cartridge between a first location and a second location, comprising:

a lead screw extending generally between the first location and the second location;

a motor connected to rotate said lead screw;

a nut on said lead screw for movement axially of said lead screw as said lead screw is rotated by said motor;

a gripper hook on said nut, said gripper hook moving along a travel path during movement of said nut on said lead screw, said gripper hook selectively engaging and disengaging the cartridge for movement between said first and second locations;

a gripper hook lifter operable to move said gripper hook between a lifted position and a lowered position so selectively engage and disengage the cartridge and thereby move the cartridge between the first and second locations; and a platform disposed below said travel path of said gripper hook on which the cartridge is supported as the cartridge is moved between said first and second locations.

2. A cartridge transport apparatus as claimed in claim 1, wherein said gripper hook lifter includes a gripper guide along which said nut moves during axial movement caused by rotation of said lead screw, said gripper guide being mounted for rotational movement about an axis of said lead screw to move said gripper hook between said lifted position and said lowered position.

3. A cartridge transport apparatus as claimed in claim 2, further comprising:

a rotational position sensor on said gripper guide to sense rotational positions of said gripper hook between said lifted position and said lowered position.

4. A cartridge transport apparatus as claimed in claim 3, wherein said rotational position sensor include a photo-interrupter.

5. A cartridge transport apparatus as claimed in claim 2, wherein said gripper hook liner includes:

a spur gear;

a motor to drive said spur gear; and an arcuate gear portion on said gripper guide and engaging said spur gear.

6. A cartridge transport apparatus as claimed in claim 1, wherein said gripper hook lifter includes a spring to bias said gripper toward a predetermined one of said lifted position and said lowered position.

7. A cartridge transport apparatus as claimed in claim 1, wherein said gripper hook has first and second ends spaced from one another in an axial direction of said lead screw, said first and second ends each having cartridge engaging portions.

8. A cartridge transport apparatus as claimed in claim 7, wherein said cartridge engaging portions each include at least cartridge engaging surfaces.

9. A cartridge transport apparatus as claimed in claim 8, wherein said cartridge engaging portions each include three cartridge engaging surfaces,
   a first of said three cartridge engaging surfaces being a hook portion for engagement inside a recess on the cartridge to pull the cartridge as said gripper hook is moved along said travel path in a first direction,
   a second of said three cartridge engaging surfaces being a first pushing surface for engagement at a first end surface of the cartridge for movement along said travel path in said first direction, and
   a third of said three cartridge engaging surfaces being a second pushing surface for engagement at a second end surface of the cartridge for movement along said travel path in a second direction opposite said first direction.

10. A cartridge transport apparatus as claimed in claim 9, wherein said cartridge engaging portions at said first and second ends are substantially mirror imager of one another, each with said three cartridge engaging surfaces.

11. A cartridge transport apparatus as claimed in claim 8, wherein said cartridge engaging portions are connected to said nut by at a spring.

12. A cartridge transport apparatus as claimed in claim 1, further comprising:
   a cartridge locking apparatus on said platform to selectively lock the cartridge in position on said platform.

13. A method for transport of a cartridge between a first location and a second location, comprising the steps of:
   engaging the cartridge at the first location by a cartridge engaging hook engaging at a front edge of the cartridge;
   pulling the cartridge from said first location to a transport platform using said cartridge engaging hook at least until a back edge of the cartridge clears a housing at the first location;
   engaging said cartridge engaging hook behind a back edge of the cartridge;
   pushing the cartridge along the transport platform toward said second location with said cartridge engaging hook;
   engaging the back edge of the cartridge with a cartridge pushing surface; and pushing the cartridge into the second location using said cartridge pushing surface.

14. A method as claimed in claim 13, wherein said first location includes a latch and further comprising the step:
   releasing the latch from the cartridge substantially simultaneously with said step of engaging the cartridge at the first location.

15. A method as claimed in claim 13, wherein said step of engaging the cartridge at the front edge of the cartridge is by a first portion of said cartridge engaging hook; and
   said step of engaging said cartridge engaging book behind the back edge of the cartridge is by a second portion of raid cartridge engaging hook.

16. A method as claimed in claim 13, further comprising the steps of:
   moving said cartridge engaging hook between a position at the front edge of the cartridge to a position at the back edge of the cartridge including
      lifting said cartridge engaging hook from a lower position at the front edge of the cartridge to a raised position;
      moving said cartridge engaging hook above the cartridge from the from edge of the cartridge to the hack edge of the cartridge
      lowering said cartridge engaging hook from said raised position to said lower position.

* * * * *